United States Patent
Rader

(12) United States Patent (10) Patent No.: US 7,127,563 B2
Rader (45) Date of Patent: *Oct. 24, 2006

(54) SHARED MEMORY ARCHITECTURE

(75) Inventor: Sheila M. Rader, Wildwood, IL (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/220,735

(22) Filed: Sep. 7, 2005

(65) Prior Publication Data

US 2006/0004976 A1 Jan. 5, 2006

(51) Int. Cl.
*G06F 12/00* (2006.01)

(52) U.S. Cl. ........................ 711/148; 711/150; 711/154; 711/149; 710/22

(58) Field of Classification Search ................ 711/148, 711/150, 154, 149
See application file for complete search history.

(56) References Cited

U.S. PATENT DOCUMENTS

| 5,978,866 | A | 11/1999 | Nain |
| 6,021,077 | A | 2/2000 | Nakaoka |
| 6,611,537 | B1 | 8/2003 | Edens et al. |
| 2001/0053069 | A1 | 12/2001 | Haba et al. |
| 2002/0174311 | A1 | 11/2002 | Ware et al. |
| 2003/0105906 | A1 | 6/2003 | Zhao |

*Primary Examiner*—Kimberly McLean-Mayo

(57) ABSTRACT

A wireless communications architecture having first and second synchronous memory devices coupled to a virtual channel memory controller by corresponding first and second data buses, and a shared address and control bus interconnecting the virtual channel memory controller and the first and second synchronous memory devices. The first and second synchronous memory devices are addressed with the shared address bus, and the first and second memory locations are accessed via the first and second data buses, respectively.

23 Claims, 4 Drawing Sheets

*—PRIOR ART—*

*—PRIOR ART—*

SHARED MEMORY ARCHITECTURE

FIELD OF THE INVENTIONS

The present inventions relate generally to mobile wireless communication architectures, and more particularly to virtual channel shared memory architectures for mobile wireless communications, combinations thereof and methods therefor.

BACKGROUND OF THE INVENTIONS

The realization of increased data rates and operation of processor intensive applications, including multimedia, Internet access, etc., in future generation wireless communication systems, for example $3^{rd}$ Generation W-CDMA systems and beyond, will require substantial amounts of memory and processing performance, which are constrained by cost, power consumption, packaging and other considerations.

In prior art FIG. 5, a known wireless communication architecture comprising discrete baseband and application processing circuits provides relatively good performance, but at a high cost and high part count, and with a large footprint.

In prior art FIG. 6, another known wireless communication architecture comprising integrated baseband and application processing circuits has a reduced the part count and a reduced foot print in comparison to discrete architectures of the type illustrated in FIG. 5. The RISC core performance in the architecture of FIG. 5, however, is limited by the memory system implementation, and DSP expansion is limited by the amount of on-chip memory.

The various aspects, features and advantages of the present invention will become more fully apparent to those having ordinary skill in the art upon careful consideration of the following Detailed Description of the Invention with the accompanying drawings described below.

DETAILED DESCRIPTION OF THE INVENTIONS

Figure 1:
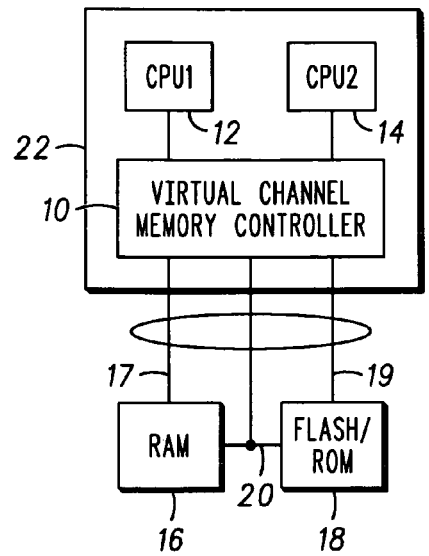
FIG. 1 is an exemplary multiple processor core, virtual channel shared memory based architecture.

In FIG. 1, a virtual channel memory controller 10 interconnects first and second processor cores 12, 14 to first and second synchronous memory devices 16, 18. The first synchronous memory device 16 is coupled to the virtual channel memory controller 10 by a dedicated first data bus 17, and the second synchronous memory device 18 is coupled to the virtual channel memory controller 10 by a dedicated second data bus 19. The first and second synchronous memory devices are also coupled to the virtual channel memory controller 10 by a shared address and control bus 20. In other embodiments, additional memory devices and processor cores may be used.

Figure 2:
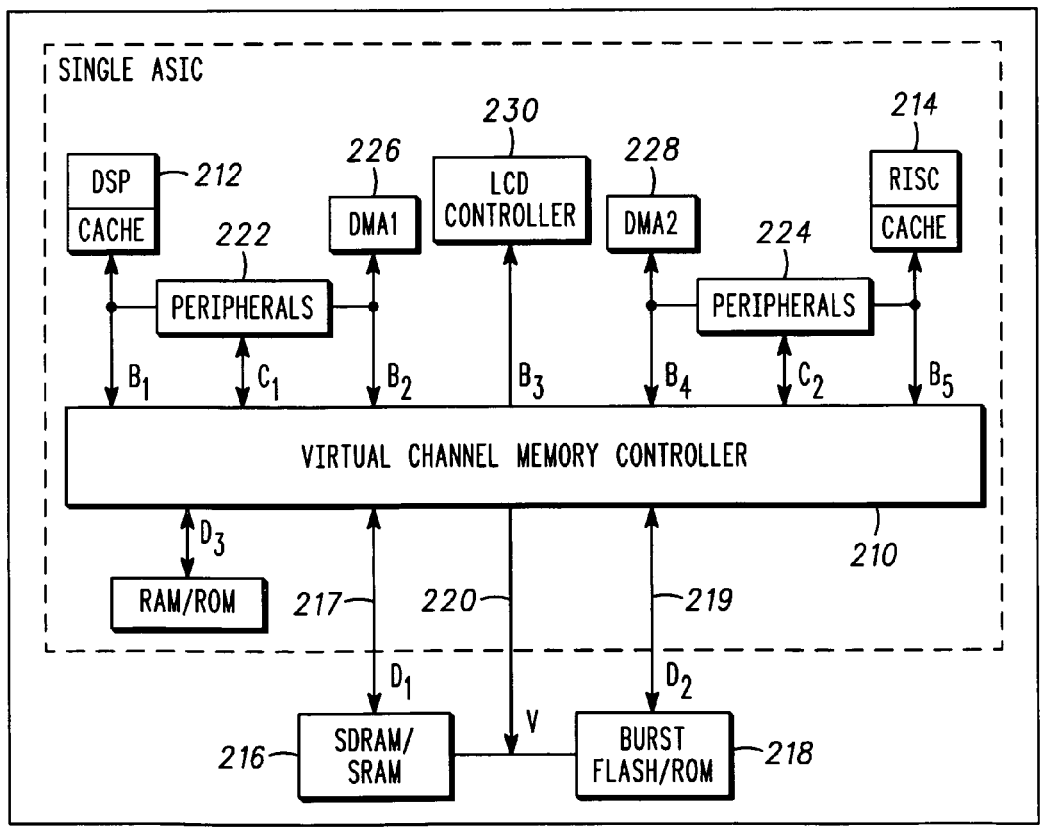
FIG. 2 is an exemplary virtual channel shared memory based wireless communications architecture.

FIG. 2 is a wireless communications architecture comprising a virtual channel memory controller 210 interconnecting a digital signal processor (DSP) 212 and a reduced instruction set (RISC) processor 214 to synchronous SDRAM or SRAM 216, and is burst FLASH/ROM 218. The SDRAM/SRAM is coupled to the virtual channel memory module by a first data bus 217, and the Burst FLASH/ROM 218 is coupled to the virtual channel memory controller by a second data bus 219. In other applications, other processor cores and synchronous memory devices may be used alternatively.

The SDRAM/SRAM and Burst FLASH/ROM are coupled to the virtual channel memory controller 210 by a shared address and control bus 220. The exemplary address bus support multiplexing. A complete address is signaled to the memory device over two clock cycles; the first cycle conveys the row address and the second cycle conveys the column address.

In FIG. 2, a first peripheral 222 interfaces the DPS core with radio hardware, and a second peripheral 224 interfaces the RISC core to keypads, keyboards, timers, serial communication modules, etc. One or more direct memory access device, for example DMA1 & DMA2 devices 226, 228, move data from/to the memory and the peripherals via the virtual channel memory controller 210.

The wireless communication architecture also includes a display controller, for example an LCD controller 230, comprising digital logic for rendering text and/or graphical images on a display based on data stored in memory. Other displays and corresponding controller may be used alternatively.

In FIGS. 1 and 2, the first and second synchronous memory devices, e.g. SDRAM/SRAM 216 and Burst FLASH/ROM 218, are preferably commodity market sourced high-density memory devices, external to the virtual channel memory controller. In FIG. 1, the virtual channel memory controller and processor cores are disposed on a common integrated circuit 22, and the first and second synchronous memory devices are external thereto. Similarly, in FIG. 2, the DSP and RISC cores 212 & 214, peripherals 222 & 224, DMA1 and DMA2 226 & 228 and the display controller are integrated with the virtual channel memory controller 210 on a single application specific integrated circuit (ASIC), and the SDRAM/SRAM and FLASH/ROM memory devices are external to the ASIC. The preferred memory devices are thus low cost and may be expanded without ASIC redesign. The shared address bus reduces pin count on ASIC.

The virtual channel memory controller supports deep pipeline and concurrent memory access to the first and second memory devices by multiple processor cores and peripherals. In some embodiments, the virtual channel memory controller also provides memory protection as discussed more fully below.

Generally, the first and second synchronous memory devices are addressed with the shared address bus interconnecting the memory devices and the virtual channel memory controller. The first and second synchronous memory devices are thus accessed simultaneously for memory location read/write operations by the corresponding first and second data buses. Addressing the memory devices while the memory devices are being accessed eliminates or reduces latency.

Figure 3:
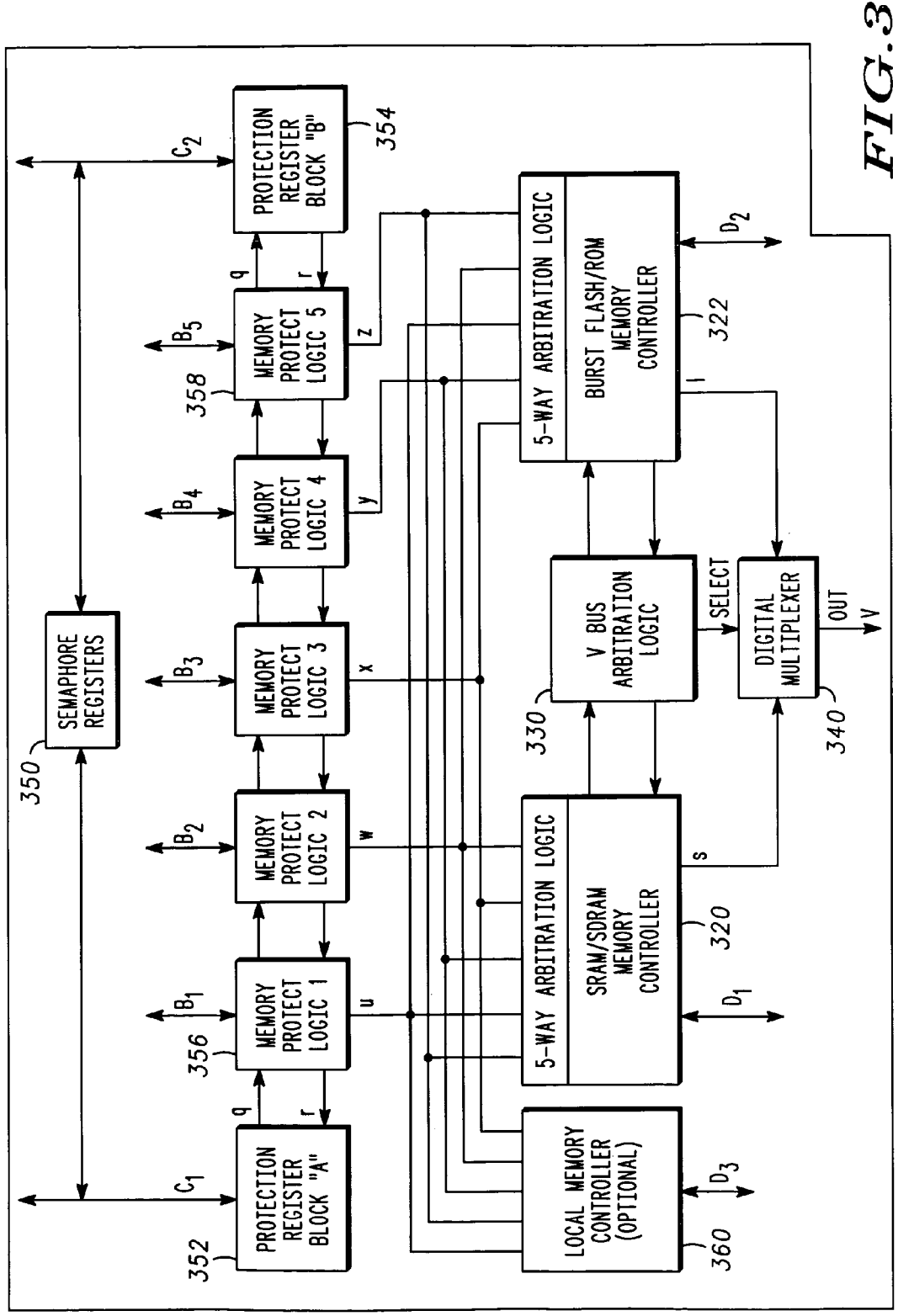
FIG. 3 is an exemplary virtual channel memory controller.

In FIG. 3, the exemplary virtual channel memory controller comprises a SRAM/SDRAM memory controller 320 and a Burst FLASH/ROM memory controller 322, which are coupled to the corresponding external memory devices my corresponding data busses $D_1$ and $D_2$ as discussed above. The memory controllers are both coupled to the processor cores, DMAs and other controllers, for example the display controller, of FIG. 2, by corresponding memory logic with data, address and control interfaces $B_1$, $B_2$, $B_3$, $B_4$ and $B_5$.

Address bus arbitration logic 330 interconnects the memory controllers 320 and 322 for resolving requests from the memory controllers for use of the shared address bus. The logic 330 includes inputs for receiving requests from the memory controllers, and outputs for enabling memory access by the controllers. Requests are resolved on a first come, first served basis. The outputs also indicate when the address bus is busy and when the requesting controller must wait.

A multiplexer 340 routes address signals from the selected one of the first and second memory controllers 320, 322 to the shared address bus. The exemplary multiplexer includes generally a digital selector with an input s, t, from each controller, and an output "out" on the shared address bus V. The multiplexer output is controlled by a "select" signal from the address bus arbitration logic 330.

Figure 4:
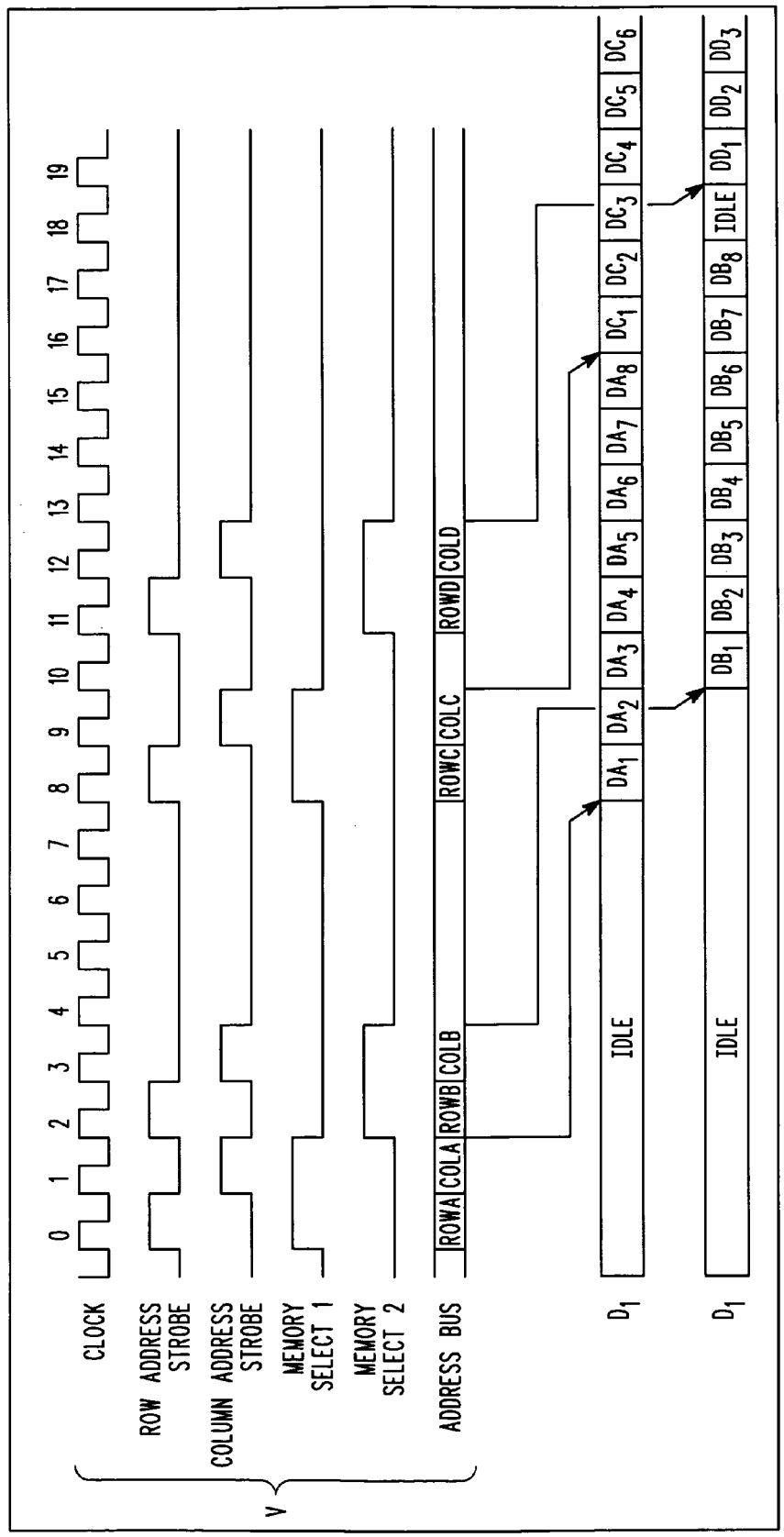
FIG. 4 is an exemplary timing diagram for a virtual channel shared memory architecture.
Figure 5:
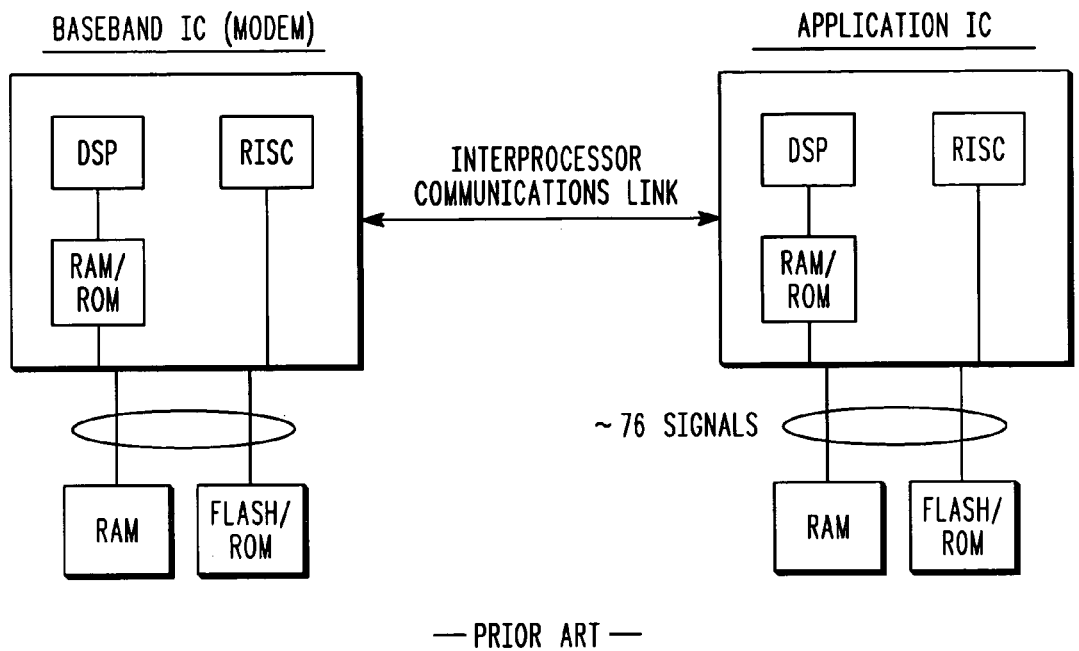
FIG. 5 is a prior art wireless communication architecture having discrete baseband and application processing circuits.
Figure 6:
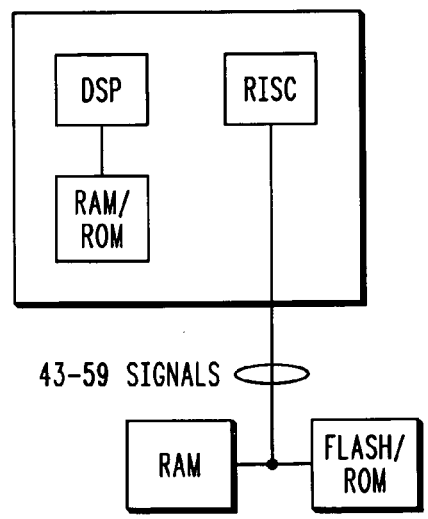
FIG. 6 is a prior art wireless communication architecture having integrated baseband and application processing circuits.

In one exemplary mode of operation, in FIG. 4, at Clock time "0", the Row Address Strobe is signaled high for Memory Select1 (SDRAM/SRAM) location "A". The Address Bus signals "Row-A" during his time period. At Clock time "1", the Column Address Strobe is signaled high for Memory Select1 (SDRAM/SRAM) location "A". The Row Address Strobe is signal low, and the Address Bus signals "Col-A".

In FIG. 4, at Clock Time "2", the Row Address Strobe is signaled high for Memory Select2 (FLASH/ROM) location "B". The Address Bus signals "Row-B" during his time period. At Clock time "3", the Column Address Strobe is signaled high for Memory Select2 (FLASH/ROM) location "B". The Row Address Strobe is signal low, and the Address Bus signals "Col-B". The access to memory location "B" in the FLASH/ROM is concurrent with access to memory location "A" in the SDRAM/SRAM.

During Clock times 4–7, no memory locations are addressed. Preferably, the address bus does not change state from is last state, "Col-B", thus reducing power consumption associated with signal transitions on the address bus. During this period, Clock time 4–7, the data busses $D_1$ and $D_2$ are idle since there were no prior data requests in the example. If the memory access is a read, the memories are retrieving data requested during this time, the memory latency period.

At Clock time "8", the first data word of a burst of 8 data words from SDRAM/SRAM appears on the data bus $D_1$. At this time also, the Row Address Strobe is signaled high for Memory Select1 (SDRAM/SRAM) location "C", and the Address Bus signals "Row-C". At Clock time "9", the Column Address Strobe is signaled high for Memory Select1 (SDRAM/SRAM) location "C". The Row Address Strobe is signal low, and the Address Bus signals "Col-C".

During Clock time "10" the address bus is inactive, and the first data word of the 8 bit data word burst from FLASH/ROM appears on data bus $D_2$. At Clock time "11", the Row Address Strobe is signaled high for Memory Select2 (FLASH/ROM) location "D", and the Address Bus signals "Row-D" during concurrent access to the SDRAM/SRAM and FLASH ROM memories.

At Clock time "12", the Column Address Strobe is signaled high for Memory Select2 (FLASH/ROM) location "D". At this time, the Row Address Strobe is signal low, and the Address Bus signals "Col-D". At Clock times "13–19", the pipeline to both memories is full, except that the delay during Clock time. "10" between the address of locations "C" and "D" caused an idle state to appear on data bus $D_2$ at Clock time "18".

In FIG. 3, the exemplary virtual channel memory controller also comprises a group of shared memory space access registers, or Semaphore registers 350, interconnecting the first and second processor core memory access register blocks 352, 354. The first and second memory access register blocks 352, 354 are coupled to corresponding processor logic blocks 356, 358 for conveying address ranges and restrictions for the core processors.

The semaphore registers 350 convey access permission to the shared memory space. The Semaphore register settings only indicate memory access policy. The shared memory space facilitates interprocessor communication of data and other information by passing by reference, rather than copying data from one memory to the other. The first and second processor core memory access register blocks 356 and 358 define memory access permission and enforce protected memory areas on the processor cores. Thus configured, the processor cores cannot change the memory access configuration for other processor core.

In FIG. 2, the exemplary virtual channel memory controller includes an optional local on-chip memory controller 360 for controlling local RAM/ROM illustrated in FIG. 2. The on-chip memory controller 360 has relatively low access times and thus does not require the deep pipelining and latency-hiding scheme discussed above in connection with the first and second external memory devices.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A shared memory system architecture, comprising:
   a memory controller module;
   first and second processor cores coupled to the memory controller module;
   a first memory device coupled to the memory controller module by a first data bus;
   a second memory device coupled to the memory controller module by a second data bus;
   a shared address and control bus interconnecting the memory controller module and the first and second memory devices;
   a group of shared memory space access registers defining access permission to shared memory space.

2. The architecture of claim 1, wherein:
   the memory controller module includes address bus arbitration logic, first and second memory controllers, and a multiplexer;
   the address bus arbitration loge is coupled to first and second memory controllers, and the multiplexer interconnects the first and second memory controllers to the shared address and control bus.

3. The architecture of claim 1, wherein the first memory device and the second memory device is one of a SRAM, SDRAM, Flash, or ROM memory.

4. The architecture of claim 1 further comprising a first direct memory access channel coupled to the memory controller module.

5. The architecture of claim 1 further comprising a display controller coupled to the memory controller module.

6. The architecture of claim 1 wherein the first processor core is a digital signal processor and the second processor core is a RISC processor.

7. The architecture of claim 1 wherein the memory controller module and the first and second processor cores are disposed on a single integrated circuit.

8. The architecture of claim 1 wherein the first memory device and the second memory device are different types of memory devices.

9. The architecture of claim 1 wherein the first memory device is characterized as a synchronous memory device and the second memory device is characterized as a synchronous memory device.

10. The architecture of claim 1 wherein the memory controller module includes a group of shared memory space access registers interconnecting first and second processor core memory access register blocks, the first processor core memory access register block coupled to the first processor core, the second processor core memory access register block coupled to the second processor core.

11. The architecture of clam 1 further comprising:
a first processor core memory access register block coupled to the first processor core;
a second processor core memory access register block coupled to the second processor core;
wherein the first processor core memory access register block and the second processor core memory access register block define memory access permission and enforce protected memory areas of the first and second processor cores.

12. A method comprising:
addressing first and second memory devices with a shared address bus interconnecting the first and second memory devices and a memory controller module;
transferring data between the first memory device and the memory controller module on a first data bus;
transferring data between the second memory device and the memory controller module on a second data bus;
conveying access permission to shared memory space with a group of registers indicating shared memory space policy;
facilitating communication between first and second processor cores with the shared memory space.

13. The method of claim 12 wherein the facilitating communication between first and second processor cores with the shared memory space further includes facilitating communication between the first and second processor cores with the shared memory space by passing data by reference.

14. The method of claim 12, concurrently accessing the first and second memory devices.

15. The method of claim 12, addressing the first memory device with the shared address bus, transferring data between the first memory device and the memory controller module in response to addressing the first memory device, addressing the second memory device with the shared address bus after addressing the first memory device, transferring data between the second memory device and the memory controller module in response to addressing the second memory device while transferring data between the first memory device and the memory controller module.

16. The method of claim 12, reducing latency by addressing one of the first and second memory devices while accessing the same memory device addressed.

17. The method of claim 12, reducing power consumption by not changing a state of the shared address bus during an interval between addressing the first and second memory devices.

18. The method of claim 12, addressing one of the first and second synchronous memory devices while accessing the first and second synchronous memory devices.

19. The method of claim 12, wherein the memory controller module and the first and second processor cores are disposed on a single integrated circuit.

20. A shared memory system architecture, comprising:
a memory controller module;
first and second processor cores coupled to the memory controller module;
wherein the memory controller module and the first and second processor cores are disposed on a single integrated circuit;
a first memory device coupled to the memory controller module by a first data bus;
a second memory device coupled to the memory controller module by a second data bus;
a group of shared memory space access registers defining access permission to shared memory space, the group of shared memory space access registers disposed on the single integrated circuit.

21. The architecture of claim 20, wherein:
the memory controller module includes address bus arbitration logic, first and second memory controllers, and a multiplexer, wherein the address bus arbitration logic, the first and second memory controllers, and the multiplexer disposed on the single integrated circuit;
the address bus arbitration logic is coupled to the first and second memory controllers, and the multiplexer interconnects the first and second memory controllers to the shared address and control bus.

22. The architecture of claim 20, a direct memory access channel coupled to the memory controller module, the direct memory access channel disposed on the single integrated circuit.

23. The architecture of claim 20, a display controller coupled to the memory controller module, the display controller disposed on the single integrated circuit.

* * * * *

UNITED STATES PATENT AND TRADEMARK OFFICE
CERTIFICATE OF CORRECTION

| | | |
|---|---|---|
| PATENT NO. | : 7,127,563 B2 | Page 1 of 1 |
| APPLICATION NO. | : 11/220735 | |
| DATED | : October 24, 2006 | |
| INVENTOR(S) | : Sheila M. Rader | |

It is certified that error appears in the above-identified patent and that said Letters Patent is hereby corrected as shown below:

In Column 4, Line 64, Claim No. 2:

Change "the address bus arbitration loge is coupled to first and" to --the address bus arbitration logic is coupled to first and--

Signed and Sealed this

Tenth Day of June, 2008

JON W. DUDAS
*Director of the United States Patent and Trademark Office*

UNITED STATES PATENT AND TRADEMARK OFFICE
CERTIFICATE OF CORRECTION

PATENT NO. : 7,127,563 B2  
APPLICATION NO. : 11/220735  
DATED : October 24, 2006  
INVENTOR(S) : Sheila M. Rader It is certified that error appears in the above-identified patent and that said Letters Patent is hereby corrected as shown below:

Title page, insert

--Related U.S. Application Data

(63) Continuation of application no. 10/008,939, filed on Nov. 8, 2001, now Pat. No. 6,950,910.--

Column 1, insert

--Priority Application

This application is a continuation of and claims priority to U.S. patent application Serial No. 10/008,939, filed on November 8, 2001 entitled MOBILE WIRELESS COMMUNICATION DEVICE ARCHITECTURES AND METHODS THEREFOR, now U.S. Patent No. 6,950,910.--

Signed and Sealed this  
Tenth Day of July, 2012

David J. Kappos  
*Director of the United States Patent and Trademark Office*